United States Patent [19]
Williams et al.

[11] Patent Number: 5,359,192
[45] Date of Patent: Oct. 25, 1994

[54] DUAL-WAVELENGTH LOW-POWER BUILT-IN-TEST FOR A LASER-INITIATED ORDNANCE SYSTEM

[75] Inventors: Michael S. Williams, Half Moon Bay; Jeffrey M. Moser, Oakland; Helen V. Gourley, San Francisco, all of Calif.

[73] Assignee: Quantic Industries Inc., San Carlos, Calif.

[21] Appl. No.: 896,218

[22] Filed: Jun. 10, 1992

[51] Int. Cl.$^5$ .................................................. G02B 5/14
[52] U.S. Cl. ................. 250/227.23; 250/226; 356/73.1
[58] Field of Search ............. 250/226, 227.18, 227.23; 356/73.1

[56] References Cited

U.S. PATENT DOCUMENTS

| | | | |
|---|---|---|---|
| 4,356,396 | 10/1982 | Ruell et al. | 250/227.23 |
| 4,498,004 | 2/1985 | Adolfsson et al. | 250/227.23 |
| 4,523,092 | 6/1985 | Nelson | 250/227.23 |
| 4,529,875 | 7/1985 | Brogardh et al. | 250/227.23 |
| 4,644,154 | 2/1987 | Brogardh et al. | 250/227.23 |
| 4,862,802 | 9/1989 | Streifer et al. | |
| 4,917,014 | 4/1990 | Loughry et al. | |

OTHER PUBLICATIONS

Booster, et al., "High Resolution for Backscatter Measurements", Lasers & Optronics. no date.

Masi, C. G. (Editor), "Fiber-Optics Test Sets", Test & Measurement World, pp. 77-78, Feb. 1991.

Nerschook, et al., "Wavelength selection for optical testing", Test & Measurement Lightwave, pp. 18-22, Oct. 1991.

Pearson, Eric, "Testing Fiber Optic Connections", Connection Technology, pp. 18-22, Sep. 1991.

Schneider, et al., "Testing requirements for fiber in the loop", Test & Measurement—Lightwave, pp. 18-21, Oct. 1991.

Primary Examiner—David C. Nelms
Assistant Examiner—Stephone B. Allen
Attorney, Agent, or Firm—Burns Doane Swecker & Mathis

[57] ABSTRACT

The optical continuity of a fiber optic conduit is tested by terminating the fiber optic conduit with an element having a wavelength-dependent coefficient of reflectivity, coupling to the fiber optic conduit light of a first wavelength band, detecting light in the first wavelength band reflected back through the fiber optic conduit, coupling to the fiber optic conduit light of a second wavelength band, and detecting light in the second wavelength band reflected back through the fiber optic conduit. A relative comparison is formed of light in the first wavelength band reflected back through the fiber optic conduit and light in the second wavelength band reflected back through the fiber optic conduit. Reliable continuity testing of a fiber optic conduit including multiple in-line connectors is thereby made possible.

29 Claims, 11 Drawing Sheets

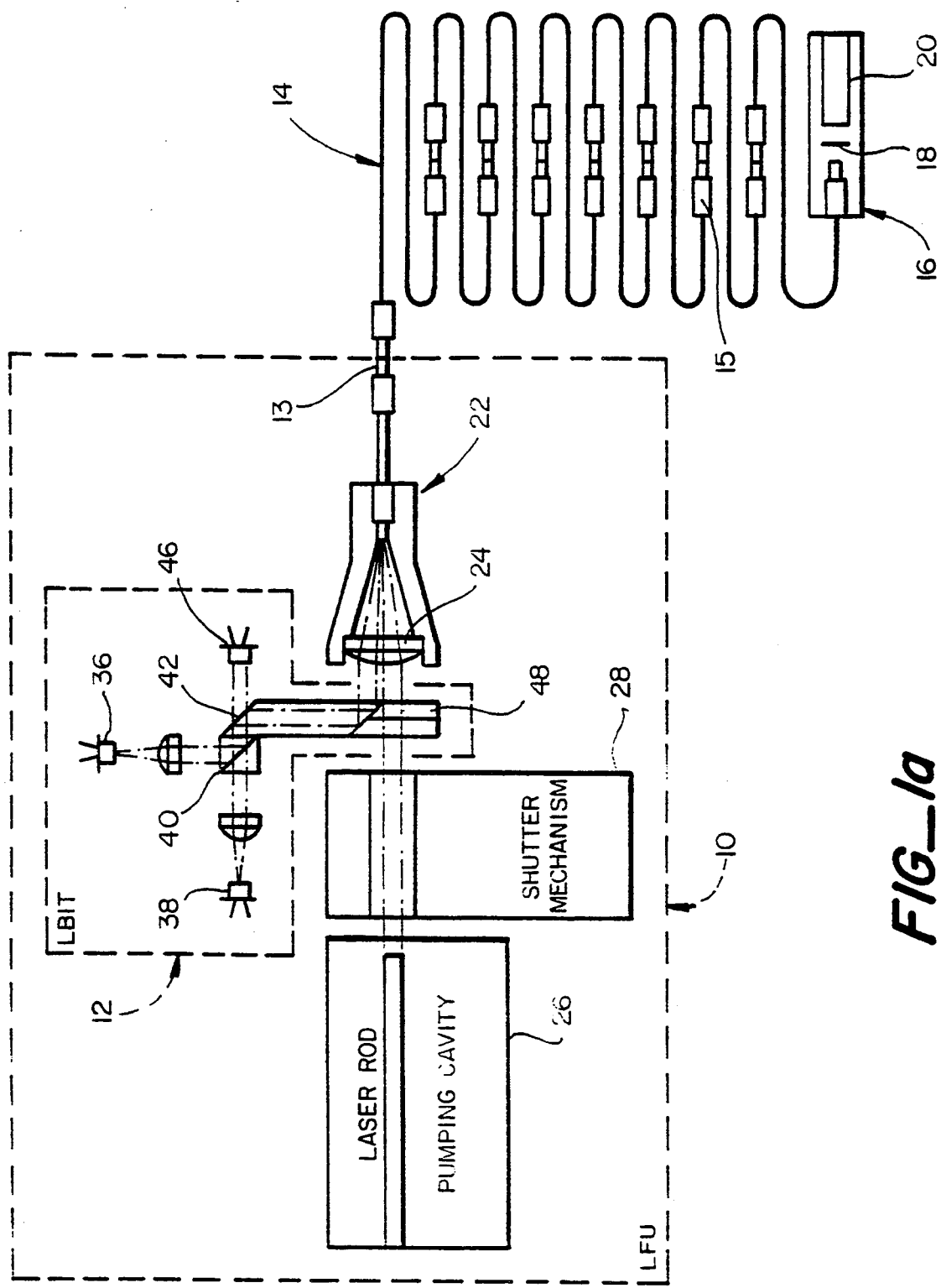
FIG_1a

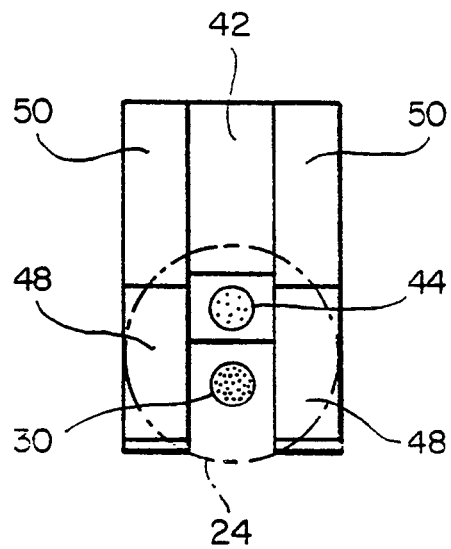
FIG_1b
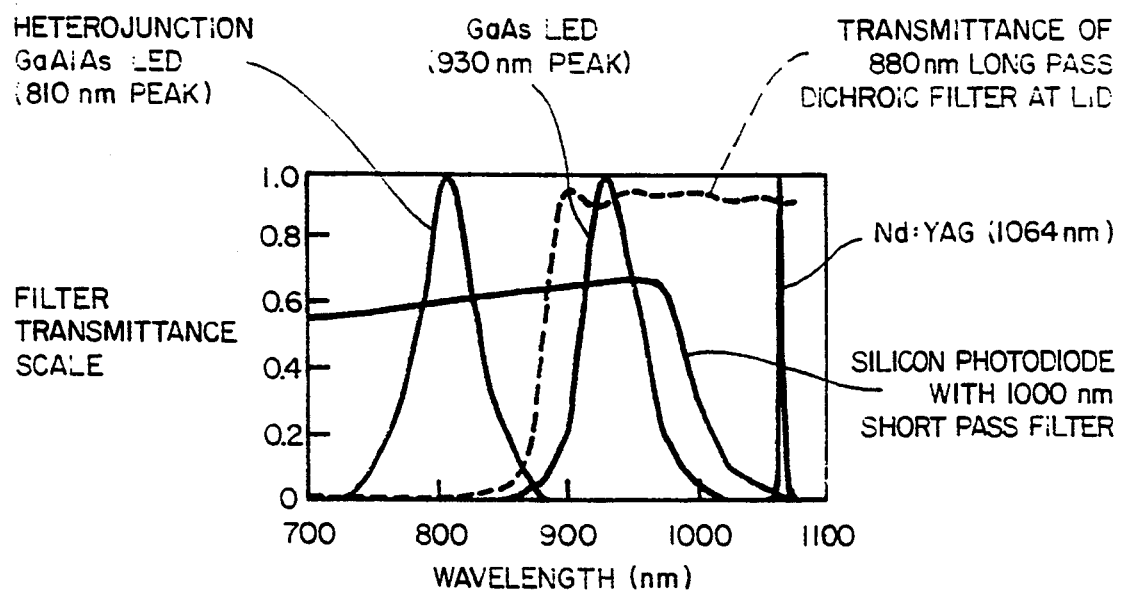
FIG_4

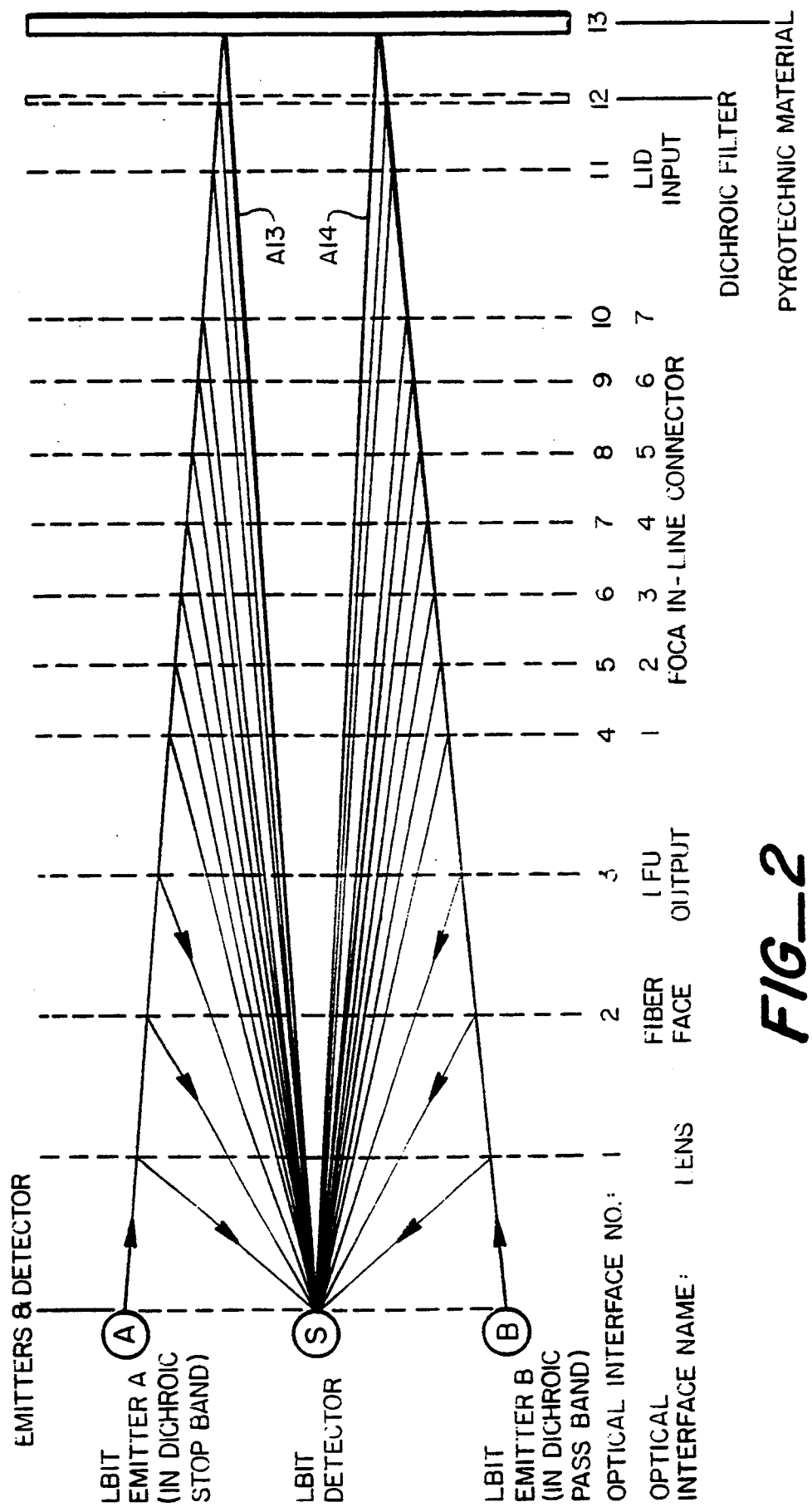
FIG_2

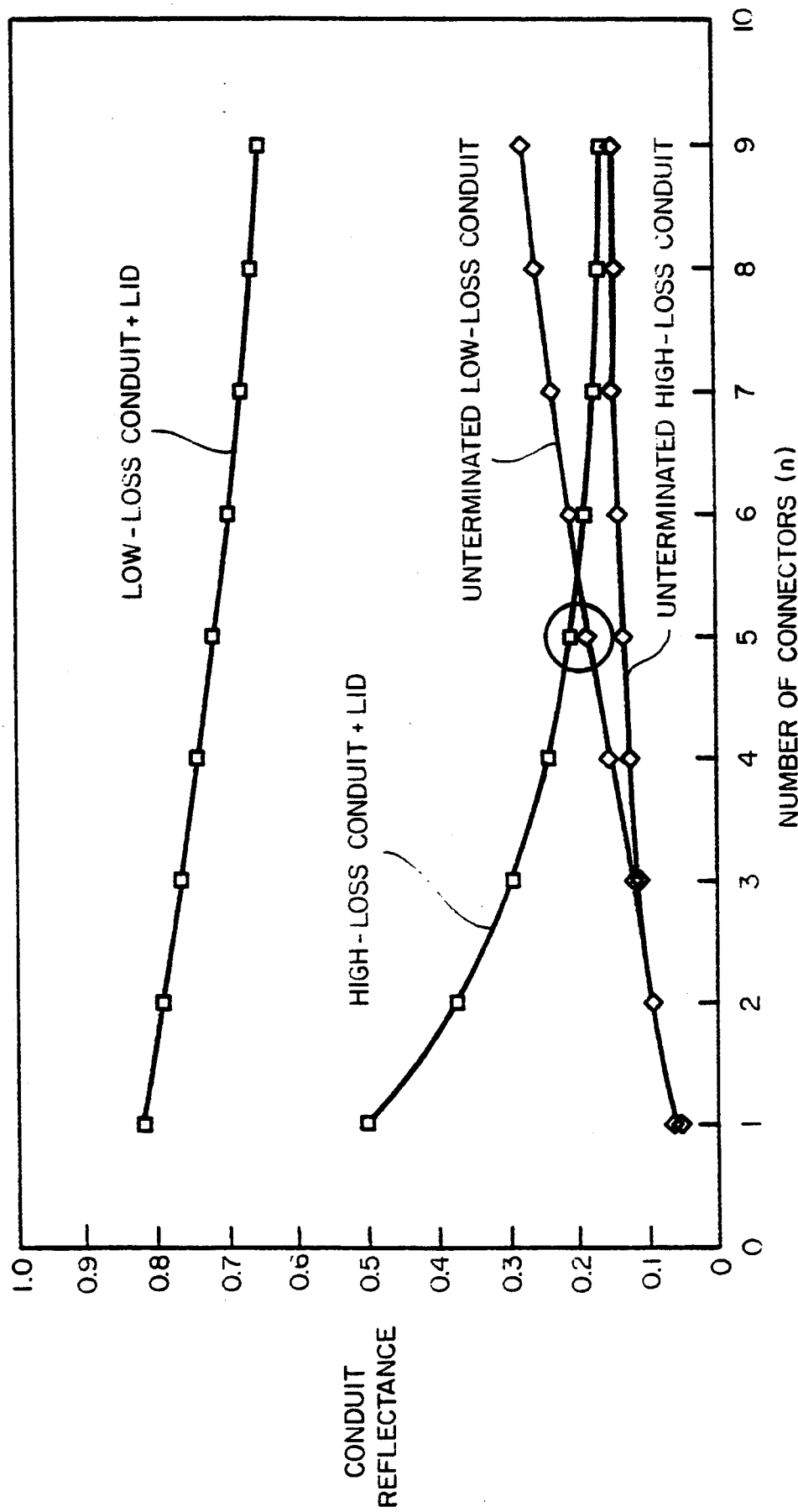
FIG_3

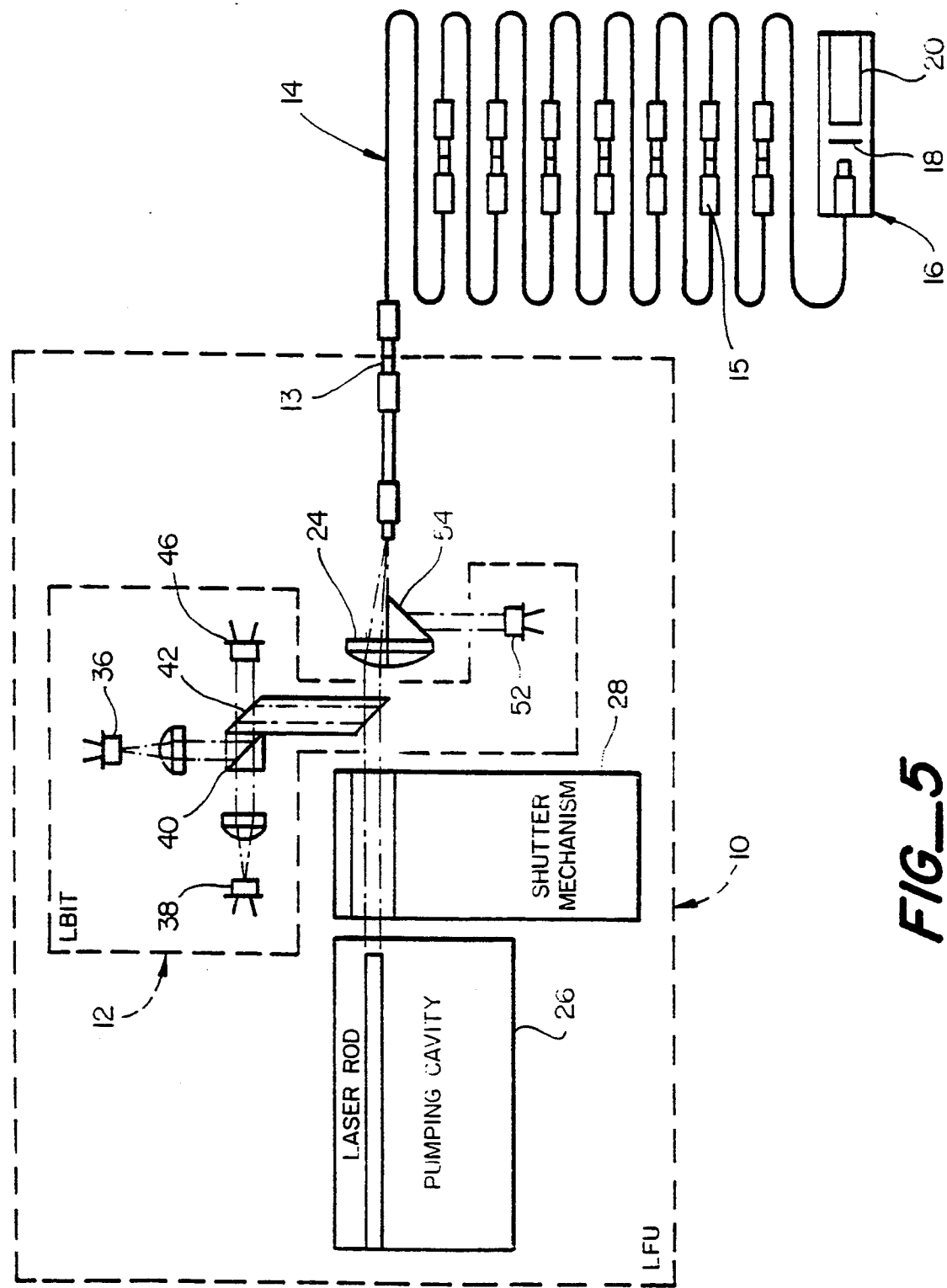
FIG_5

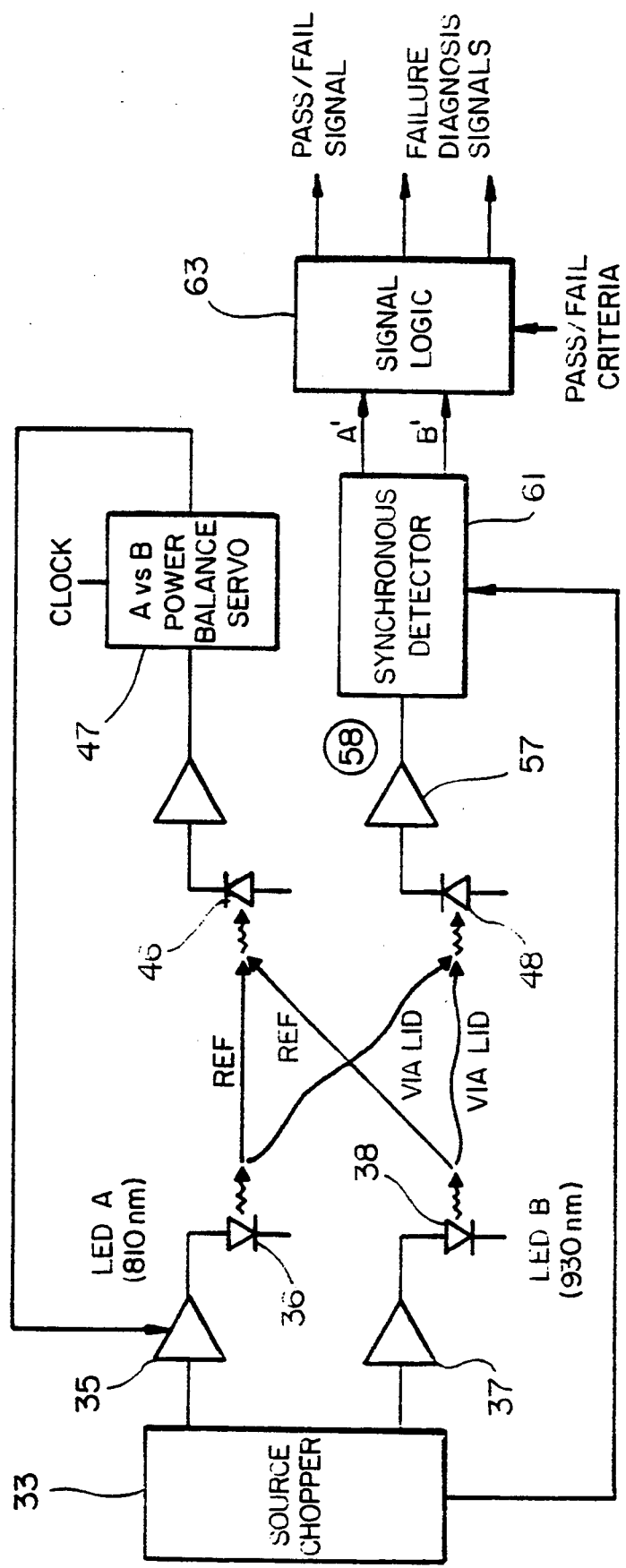
FIG_6

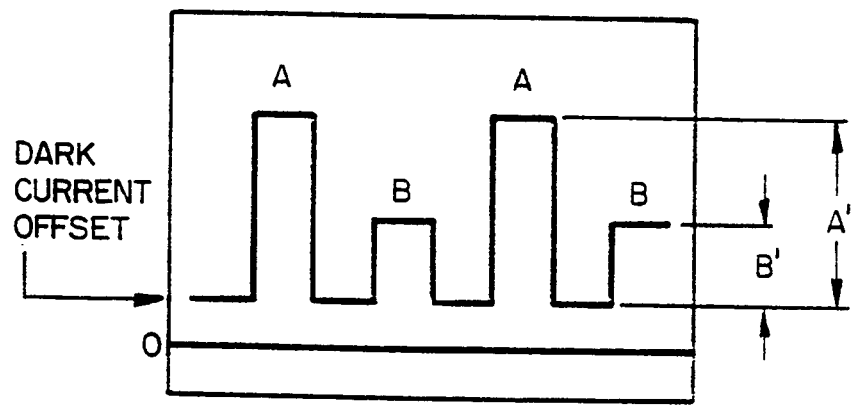
FIG_7
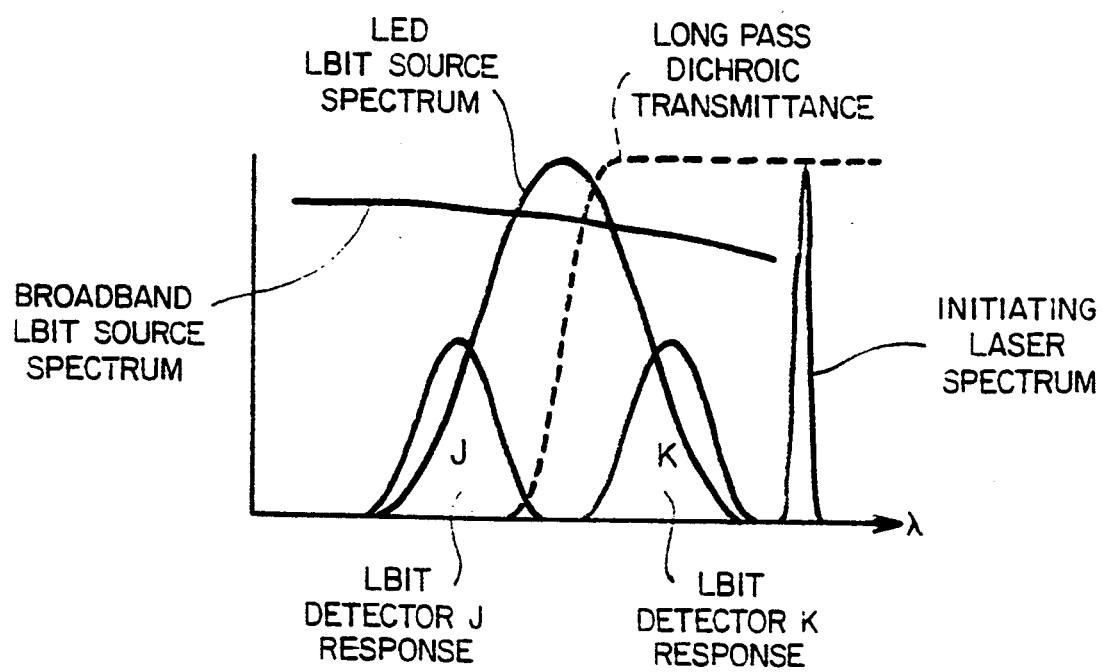
FIG_10

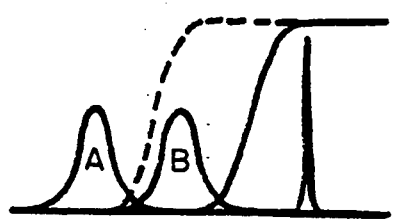
FIG_8a
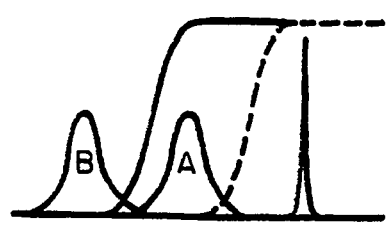
FIG_8b
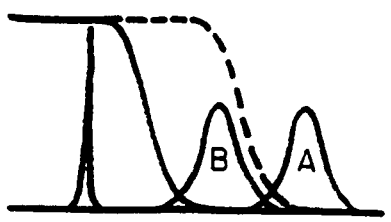
FIG_8c
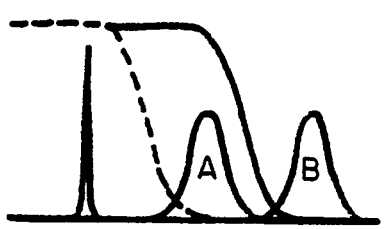
FIG_8d
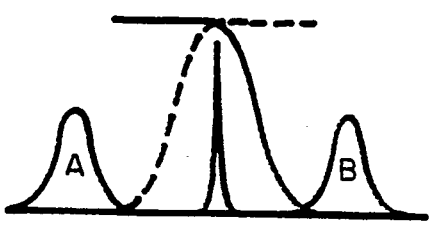
FIG_8e
FIG_8f

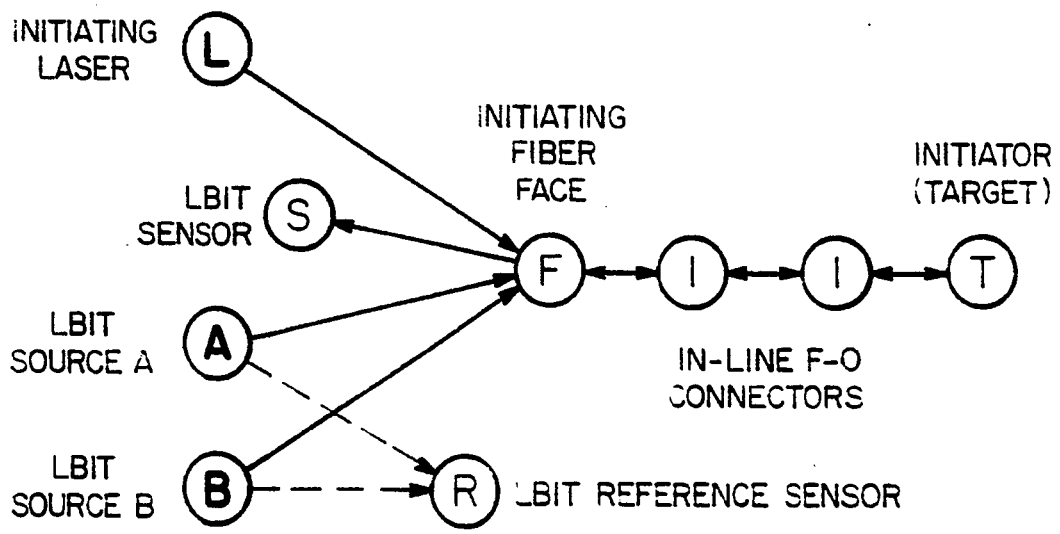
FIG_9a
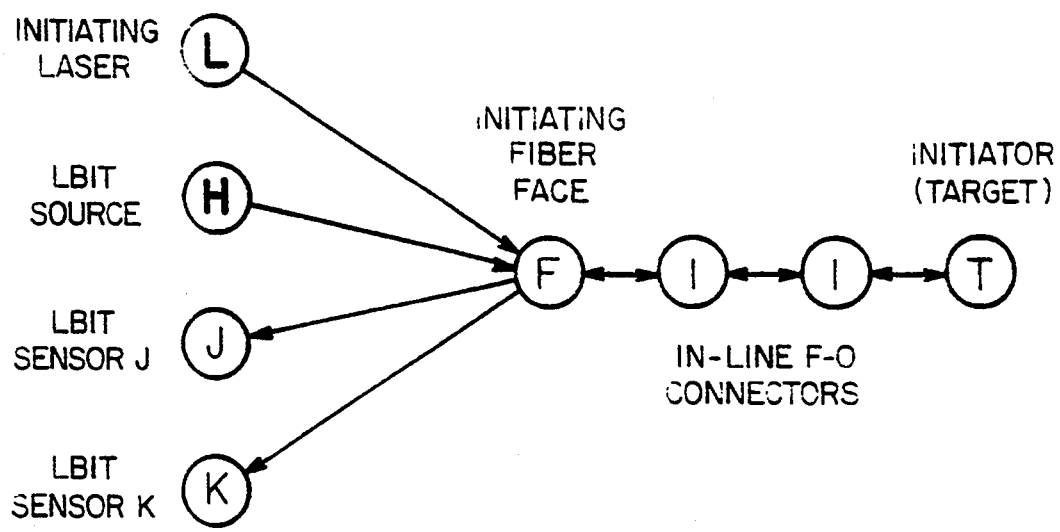
FIG_9b

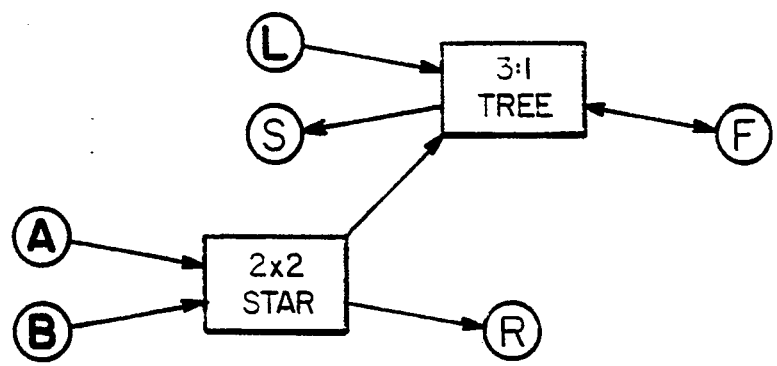
FIG_11a
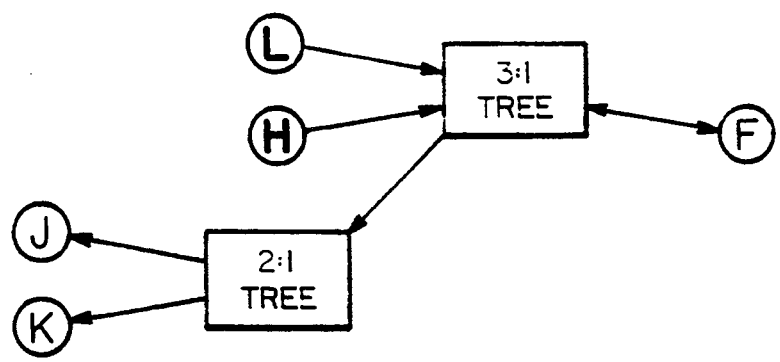
FIG_11b
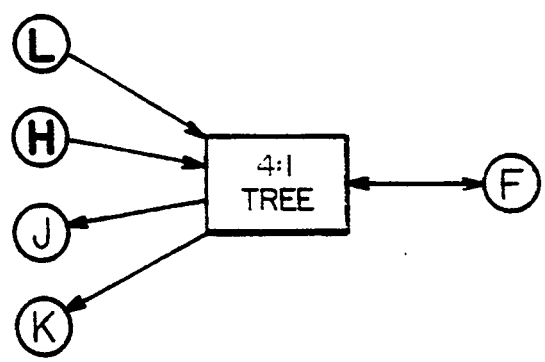
FIG_11c

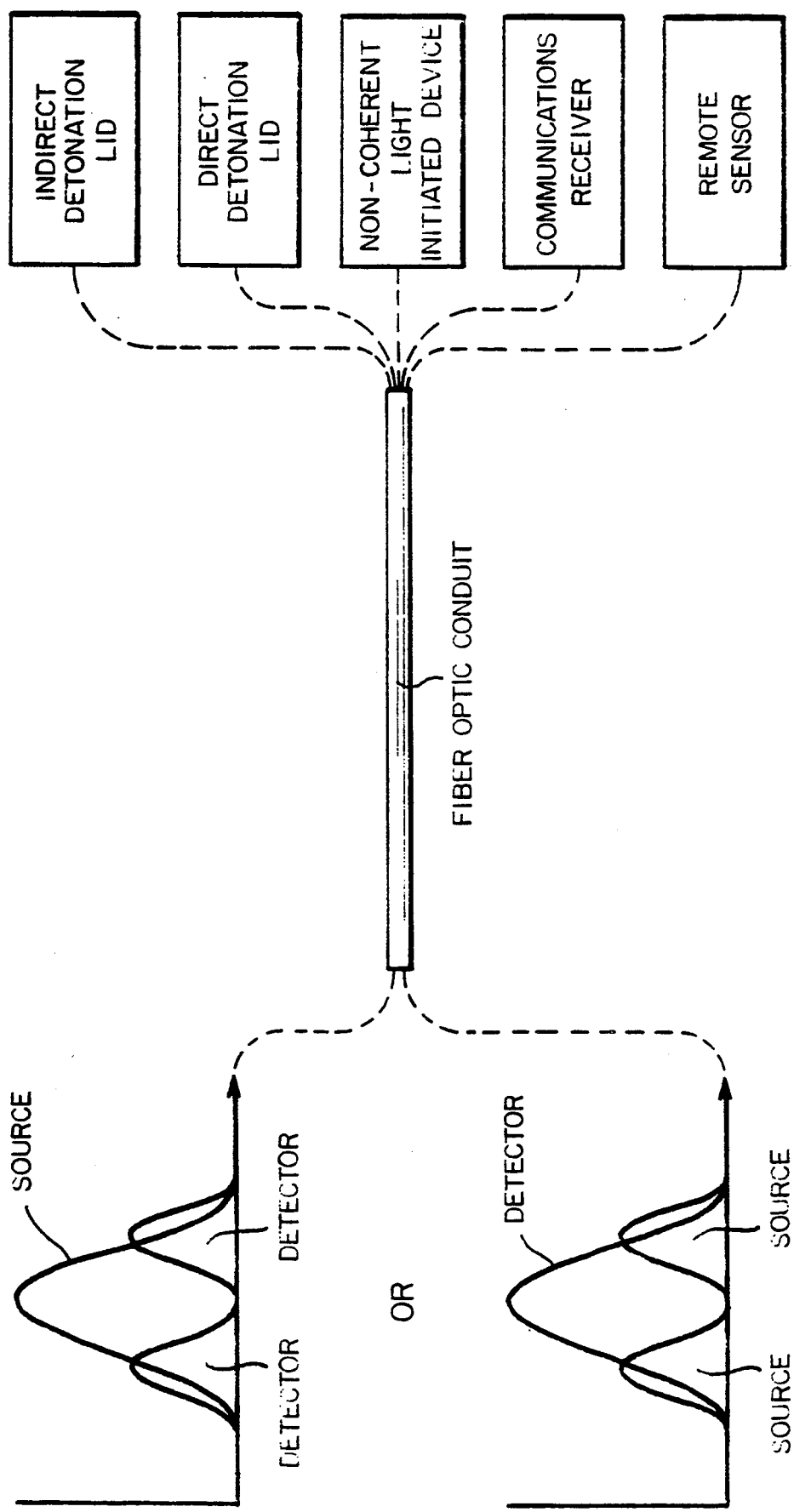
FIG_12

DUAL-WAVELENGTH LOW-POWER BUILT-IN-TEST FOR A LASER-INITIATED ORDNANCE SYSTEM

BACKGROUND OF THE INVENTION

1. Field of the Invention

The present invention relates to the testing of a laser-initiated ordnance system and more particularly to a dual-wavelength low-power built-in-test technique for confirming optical continuity between a laser firing unit (LFU) and a laser-initiated device (LID) connected together by one or more fiber optic cable assemblies (FOCAs) in series. The technique uses a dual-wavelength spectrographic method that takes advantage of the spectral signature of a component of the LID.

2. State of the Art

Laser initiation systems are well known in the art, in which a light pulse is passed along a fiber optic cable and caused to impinge on and heat to ignition a pyrotechnic material. Laser initiation systems are safer than electrical initiation systems in that the former are not susceptible to inadvertent initiation by stray electromagnetic radiation. In addition to avoiding accidental operation, however, ordnance systems are also required to reliably operate upon occurrence of a predetermined stimulus. Continuity of a firing channel must therefore be confirmed. In the case of an electrical firing unit, verification of electrical continuity is relatively straightforward, although appropriate safety precautions must be observed. In the case of a laser firing system, verifying continuity becomes more difficult. The fiber optic cable may be severed, crushed or otherwise damaged.

One known method of testing optical continuity is optical time domain reflectometry (OTDR). An optical time domain reflectometer measures light scattered back toward the input as light moves down a fiber. OTDR creates a trace representing the reflection of light as a function of position along the fiber. Advantages of OTDR are that it shows where light is reflected along the fiber and requires access to only one end of the fiber. Significant disadvantages of OTDR are its high cost, bulky and heavy package, relatively short measurement range, need for a trained user, and lack of sufficient spatial resolution.

U.S. Pat. No. 4,917,014 describes a continuity test system employing in an initiator a dichroic filter which reflects light within one wavelength range for continuity test purposes and transmits light within a second wavelength range for ignition purposes. A wavelength selector in the laser firing unit selects between a test stimulus and an ignition stimulus. Light energy at the test wavelength is reflected by the dichroic filter back through the optical fiber. Thus, in a test mode of operation, the continuity test system indicates integrity of the optical system as a function of such reflected energy.

U.S. Pat. No. 4,862,802 describes various methods of verifying LID ignition by sensing pyro-generated light from the LID which propagates back up the optical cable to the laser. The same verification facility is used to determine if optical fibers and pyrotechnic elements have been properly connected, using the initiating laser source to emit a low-power test stimulus. Light reflected at the interface of the optical fiber and the pyrotechnic element experiences a change in intensity and phase from that of an unterminated fiber. Changes in intensity and phase may be detected to enable a user to verify proper connection. The described feature appears to relate to verifying the quality of a connection as the connection is made, as opposed to an automated post-connect or on-demand built-in-test. The built-in-test facility of the present invention, on the other hand, is fully automatic and not dependent on human intervention.

In large systems, a fiber optic conduit may include several fiber optic cable assemblies connected by in-line connectors. For example, in a rocket system, separate stages may each have their own fiber optic cable assemblies, these cable assemblies being joined by in-line connectors to form a single continuous fiber optic conduit. In such an instance, light reflected from the fiber interface surfaces of the in-line connectors is liable to have a similar magnitude of combined reflected energy as that of the light reflected from the LID interface; therefore, it can "swamp" the light reflected from the LID, preventing reliable detection. The present invention addresses this shortcoming.

A further shortcoming of prior art continuity test methods is the inability to explicitly test continuity to the surface of the pyrotechnic material itself, relying rather on reflectance from intervening optical elements of the LID. The present invention permits continuity testing to the surface of a pyro-technic material having spectrally-dependent reflectance.

SUMMARY OF THE INVENTION

According to the present invention, the optical continuity of a fiber optic conduit normally terminated by, and in optical continuity with, an element having a wavelength-dependent reflectivity is tested by coupling light of a first wavelength band to the fiber optic conduit, detecting light in the first wavelength band reflected through the fiber optic conduit, coupling light of a second wavelength band to the fiber optic conduit, and detecting light in the second wavelength band reflected through the fiber optic conduit. A relative comparison is formed of light in the first wavelength band reflected through the fiber optic conduit and light in the second wavelength band reflected through the fiber optic conduit. If optical continuity exists between the fiber optic conduit and the element having a wavelength-dependent reflectivity, more light will be reflected in one of the wavelength bands than the other. Reliable continuity testing of the fiber optic conduit including in-line connectors is thereby made possible, by detecting the characteristic relative difference of the reflected light energies of the different wavelengths of the different wavelengths.

BRIEF DESCRIPTION OF THE DRAWINGS

The invention may be understood from the following detailed description in conjunction with the appended drawings. In the drawings:

FIG. 1a is a schematic diagram of a first embodiment of the present invention;

FIG. 1b is a projection of the various light beams and detectors in FIG. 1a on the coupling lens aperture;

FIG. 2 is a diagram illustrating the various components of reflected light reflected from various interfaces in the system of FIG. 1;

FIG. 3 is a graph of conduit reflectance as a function of a number of in-line connectors in the conduit;

FIG. 4 is a graph showing the optical spectral characteristics of various ones of the components of FIG. 1;

FIG. 5 is a schematic diagram of a second embodiment of the present invention;

FIG. 6 is a simplified block diagram of an LBIT regulation and detection circuit;

FIGS. 7 is a diagram of waveform signals input to and signals output from the synchronous detector circuit of FIG. 6;

FIGS. 8a-8f are diagrams showing alternative optical filter arrangements that may be used in conjunction with the present invention;

FIGS. 9a and 9b are diagrams representing alternative source/detector arrangements that may be used in conjunction with the present invention;

FIG. 10 is a diagram showing the optical characteristics of various ones of the components represented in FIG. 9b;

FIGS. 11a, 11b, and 11c are diagrams representing alternative coupling arrangements that may be used in conjunction with the present invention; and FIG. 12 is a representation of various possible continuity test arrangements

DETAILED DESCRIPTION OF THE PREFERRED EMBODIMENTS

Referring now to FIG. 1, a laser firing unit (LFU) 10 optically coupled through an optical conduit 14 to a laser initiated device (LID) 16 for firing the LID is provided with a low-power built-in-test (LBIT) assembly 12. The LBIT tests optical continuity of the optical conduit by injecting light into the optical conduit and sensing the amount of injected light reflected back. Light may be coupled into the optical conduit by an optical coupler assembly 22 including a coupling lens 24. Light is reflected in succession by the coupling lens, the fiber face, a number of in-line connectors 15 joining together separate fiber optic cable assemblies forming the optical conduit, a dichroic filter 18 included in the LID 16 and a pyrotechnic material 20 also included in the LID.

The laser firing unit 10 includes a laser 26, for example of the Nd:YAG type, and (optionally) a shutter mechanism 28. The laser 26 is aligned with the coupling lens 24 to direct a small diameter intense beam 30 of laser light onto the coupling lens 24 when the shutter mechanism is open, the coupling lens then focusing the light onto the fiber face of the LFU terminus of the fiber optic conduit. The LID is initiated by first opening the shutter mechanism 28 and then supplying power to the laser 26 such that an intense light pulse is coupled into and propagates through the optical conduit to the LID 16. The laser 26 produces light having a wavelength within the passband of the dichroic filter 18. The light passes through the dichroic filter 18 and impinges on the pyrotechnic material 20, heating the pyrotechnic material to its initiation temperature. In a preferred embodiment, the laser 26 produces light having a wavelength of 1064 nm.

The dichroic filter 18 is provided to facilitate continuity testing and is a longpass filter, having a cutoff wavelength in a preferred embodiment of about 880 nm. This wavelength is below the wavelength of the initiating laser and between the wavelength bands of two continuity test sources. The longpass characteristic of the dichroic filter provides it with a distinctive spectral signature that is not mimicked by any other element in the optical path or by any known fault condition. During continuity testing, two different wavelengths of light are injected into the optical conduit, one wavelength within the passband of the dichroic filter 18 and the other wavelength below the passband of the dichroic filter 18. Reflections of light of the two different wavelengths are measured. If the dichroic filter 18 is present, a significant measurable difference will be detected between intensities of the two different wavelengths of reflected LBIT light, indicative of continuity. The other elements in the optical path exhibit a substantially flat optical response within a band encompassing the two wavelengths and therefore do not contribute significantly to the difference in the intensities of the reflected light. If no significant difference is measured between the intensities of reflected light of the two different wavelengths, it follows that the required amount of LBIT light energies have not reached the dichroic filter 18, and a fault condition is indicated.

In one embodiment, the LBIT assembly 12 may be simply realized by alternatingly injecting first light of one test wavelength and then light of the other test wavelength into the optical conduit. Two LBIT light sources 36 and 38 are directed through collimating lenses to a source mixing device 40. One of the light sources may be, for example, an 810 nm LED and the other light source may be, for example, a 930 nm LED. Light from the source mixing device enters an injection prism 42 that causes most of the light to be reflected to form a small-diameter low intensity light beam 34 on an upper portion of the aperture of the coupling lens 24 as best seen in FIG. 1b. A first reflective surface of the injection prism 42 is only partially reflective, forming a beamsplitter, allowing a portion of the light to be detected by an LBIT source power reference detector 46. The source power reference detector 46 is used to ensure that the LBIT light sources 36 and 38 provide the injection prism 42 with sufficient light energies, and to normalize the measured reflected signals with respect to transmitted energy levels or to control a servo that adjusts the transmitted energy levels to be a desired ratio.

A portion of the light injected into the optical conduit is reflected at each optical interface encountered and is detected by LBIT detectors viewing the coupling lens 24. The objective of the design is to capture as much of the light reflected through the optical conduit as practical. In the embodiment illustrated in FIG. 1b, two large-area LBIT photodetectors 48, of identical spectral response, and wired in parallel, are supported by LBIT detector mounting blocks 50 and detect light reflected through the optical conduit and transmitted back through the right-most approximately one-third of the coupling lens and the left-most approximately one-third of the coupling lens, respectively. Other numbers of LBIT detectors are compatible with this and other laser coupling geometries.

The manner in which light from the LBIT sources 36 and 38 is reflected from the optical interfaces encountered along the optical conduit may be appreciated with reference to FIG. 2. The two light sources are designated as A and B and the detectors are collectively designated as S.

Referring to FIG. 2, as light is injected from source A into the optical conduit, a portion of that light is reflected back at a first optical interface formed by the coupling lens 24, an additional portion is reflected back by a second optical interface formed by the face of the optical fiber, and a further portion is reflected back by a connector at the output 13 of the laser firing unit 10. At each of seven subsequent in-line connectors (forming the fourth optical interface through the tenth optical interface in FIG. 2), a portion of the light is reflected. An eleventh optical interface is formed where the optical fiber is joined to the LID, causing a further portion of the light to be reflected. Light is then reflected by the dichroic filter, forming a twelfth optical interface, and finally by the pyrotechnic material, forming a thirteenth and final optical interface. The portion of light reflected by the pyrotechnic material is designated A13. Light from light source B in turn undergoes the same reflections. Other optical elements in the LID may also contribute to the overall reflectance, but such contribution has been assumed to be negligible for purposes of illustration.

The reflectance of each optical interface except for the twelfth optical interface formed by the dichroic filter (and possibly the thirteenth optical interface formed by the pyrotechnic material) is substantially independent of wavelength over the wavelength bands utilized in the system. The reflectance of each interface of fixed elements such as the LFU coupling lens is also substantially constant over time and sufficiently tolerant of stresses in a well-designed system to present stable optical performance over the range of stresses encountered.

However, the reflectance of the fiber optic connectors in the fiber optic conduit, although spectrally flat, can be expected to exhibit large variations from connector to connector and, for a given connector, large variations after each demating/mating cycle and during use. These variations are caused by changes in the relative orientation and separation of the two fiber faces of each mated connector pair and possibly contamination. For example, a type of high-quality fiber optic connector specified for missile laser ordnance use provides forward insertion losses ranging from 0.2 dB (4.5%) to 1 dB (21.6%). The corresponding range of reflectance, based on a scattering loss model, is from 4.5% (for the 0.2 dB insertion loss case) to 6.8% (for the 1 dB insertion loss case). Since this type of connector does not employ antireflection coatings on the fiber faces, the expected reflectance from an unterminated connector half is the Fresnel reflectance of a glass/air interface, which is on the order of 4%.

The portion of light reflected by the dichroic filter will differ greatly between the wavelength bands of sources A and B. For example, if light source A has a spectral peak of 810 nm and light source B has a spectral peak of 930 nm, the dichroic filter will reflect about 95% of the power incident from light source A and about 5% of the power incident from light source B.

The characterization of the reflectance properties of the fiber optic conduit must take into consideration the reflectance of faults which may exist in the conduit. An unterminated connector is one such fault. Another common type of fault is a fractured fiber. After the two sides of the fracture have separated due to normal stresses in the cable, the glass-air interface on the LFU side of the fracture will reflect an amount of light which depends upon the angle of fracture. For an oblique fracture, most of the reflected light will fall outside the fiber's angle of acceptance and propagate in the fiber cladding where it will dissipate. A perfectly perpendicular planar cleave will behave like an unterminated connector half. The final known type of fiber fault is a crushed fiber. Here, most of the highly diffused light reflected off the large number of glass particles will fall outside the fiber's angle of acceptance and be lost to the cladding.

There are no known fiber optic cable faults or reflective artifacts whose reflectance approaches the reflectance of a dichroic filter in its stopband.

The total reflectance of the optical conduit, as observed from the LFU, can be estimated by an analytical expression which accounts for both the outbound and return path attenuation suffered as a result of each of the optical paths identified in FIG. 2. The magnitude of reflectance can be bounded by two cases, the low-loss conduit case in which all in-line connectors exhibit minimum insertion loss (and hence reflectance), and the high-loss conduit case in which all in-line connectors exhibit maximum insertion loss. In both cases, the reflected power (Pr) can be related to the power coupled into the conduit (Pc) by the approximate expression:

$$Pr = Pc\left[ R\left[ \sum_{i=1}^{n} (T^{2i-2}) \right] + FT^{2n} + ZT^{2n}(1 - F)^2 \right]$$

where R is the reflectance of each connector, T is the transmittance of each connector, n is the number of connectors, F is the reflectance of the dichroic filter in the wavelength band of interest, and Z is the reflectance of the initiation mixture in the wavelength band of interest. This expression disregards small losses which may occur in the dichroic filter.

Using the values of R and T for the low-loss conduit and high-loss conduit cases, it is possible to estimate Pr as a function of n. FIG. 3 is a graph showing the expected conduit reflectance vs. number of connectors under four conditions. The uppermost curve is the reflectance of a conduit with efficient (0.2 dB insertion loss) connectors, terminated by a LID having dichroic filter and initiation mixture reflectances of 0.9 and 0.2, respectively, in the wavelength band of the light being used. The next uppermost curve is the reflectance of a conduit having lossy (1 dB insertion loss) connectors, terminated by the same LID and illuminated with light in the same wavelength band. The two lower curves show the reflectances of these same conduits under the same illumination condition, but with both conduits unterminated, that is, not having the LID attached to the far terminus.

As the circled intersection on the graph shows, the reflectance of the properly terminated, low-loss conduit only marginally exceeds that of the unterminated, high-loss conduit when the number of connectors is five. This demonstrates that a nonspectrographic, continuous-wave reflectometry test would be unable to distinguish the presence of the LID once the number of connectors grew beyond this number. Using this method, the weakest criterion for a robust measurement would be to have four or fewer connectors in the conduit. Since the conduit generally requires connectors at the LFU and LID physical interfaces, and may also require a connector within the LFU to couple the portion of the conduit within the LFU to a hermetic optical feedthru, this criterion would limit the number of in-line connectors to one or two. Therefore, the nonspectrographic, continuous-wave method would be unsuitable for complex laser ordnance systems requiring a greater number of in-line connectors.

However, by utilizing the described spectrographic method, the presence of the LID can be reliably determined when additional connectors are introduced in the optical conduit. The curves in FIG. 3 also serve to illustrate the limitations of the spectrographic method, since the reflectance provided by a properly terminated LID in the wavelength band which the LID is designed to absorb in general will not be less than the reflectance of the unterminated end of the conduit. Therefore, for a given number and condition of connectors in the conduit, the differential reflectance of the conduit/LID system under dual wavelength band illumination is bound by the curves in FIG. 3. The worst case condition for the spectrographic method is for the lossy conduit, where the differential reflectance of the conduit is seen to approach zero at n=9. However, even this small differential can be detected by the ratiometric detection method discussed below, since any short term variability in the conduit transmittance can be expected to be uncorrelated with the modulation of the sources.

LBIT operation may be further understood with reference to FIG. 4, illustrating the optical frequency characteristics of the sources and detectors in FIG. 1. FIG. 4 assumes the use of light emitting diodes (LEDs) as the LBIT sources. Either LEDs or laser diodes may be used as the light sources as explained in greater detail below.

As may be observed in FIG. 4, three different wavelengths of light are injected into the optical conduit at different times. One of the LBIT light sources produces light in the 810 nm band, and the other LBIT source produces light in the 930 nm band. The laser produces light of high spectral purity very near 1064 nm. The power of each of the light sources is shown normalized to unity. In actual operation, however, light produced by the LBIT sources is typically required to be from two to four orders of magnitude lower in power than a specified LID "no-fire" power level for safety reasons. Similarly, light produced by the laser to achieve initiation is required to be some margin greater than a specified LID "all-fire" power level to ensure reliable initiation.

The cutoff wavelength of the longpass dichroic filter at the front end of the LID occurs at about 880 nm, in between the spectral peaks of the LBIT light sources. Approximately 95% of power from the 810 nm source is reflected, whereas less than 5% of power from the 930 nm source is reflected. The cutoff slope of the dichroic will be flattened to some extent if illuminated over a broad angle, as from a fiber face, and this effect must be accounted for in the spectral separation of the detectors.

The LBIT detectors 48 may be realized using silicon photodiodes. To protect the photodiodes from light scattered back during operation of the laser, they may be preceded by 1000 nm shortpass filters. The detectors exhibit substantially constant sensitivity throughout a band encompassing the outputs of both LBIT sources. To the extent that the detector(s) exhibit different sensitivities to the two source wavelength bands, the difference in sensitivity will be fixed and may be normalized in a known manner.

Experiments indicate that under some conditions, the reflected light detected by the LBIT detectors may be dominated by light back-scattered from the face of the coupling lens 24, making differences between light reflected through the optical conduit at the two different wavelengths more difficult to detect. This problem may be overcome using an alternate arrangement shown in FIG. 5. Instead of locating LBIT detectors on the laser side of the coupler lens, an LBIT detector formed by a single large-area photodiode 52 is located on the fiber side of the coupler lens. A mirror 54 or other element is arranged to redirect light reflected back toward the coupler lens away from a portion of the coupler lens and onto the photodiode(s). If space permits, the photodetector(s) can be mounted between the coupler lens and the fiber face to directly view the fiber face. The laser and the two LBIT sources share a remaining portion of the coupler lens aperture. In this embodiment, the photodetector(s) are not exposed to light from the LBIT sources reflected by the coupler lens.

Power regulation of the LBIT sources and detection of reflected light may be carried out in a manner illustrated in FIG. 6. The LBIT sources 36 and 38 are driven by LED (or laser diode) drivers 35 and 37 activated on opposite phases of a source chopper 33 operating at a suitable frequency. A deadband is provided between illumination of the two sources to facilitate correction by the processing electronics for dark current offsets produced by the LBIT detectors 48. The power output of the LBIT sources is detected in turn by the LBIT source power reference detector 46, the output of which is amplified and input to a power balance servo 47. The power balance servo forms an error signal representative of the difference in power between the output of the two LBIT sources and controls the input power to one of the LBIT sources to cause that source to output substantially the same amount of power as the other source. Alternatively, the servo can operate the sources at some unequal power balance more favorable to continuity detection, or the source power reference detector can be used to normalize the detected reflectance signals to the actual source power levels rather than to control the output of the sources.

Immunity from reflectance caused by the continuity of test light on its outbound path to the LID can be achieved by combining the dual-wavelength continuity test method with a low-resolution time domain feature. In this approach, the LBIT source or sources and detector or detectors are selected to have fast modulation rise and fall times. The source or sources are operated in pulsed mode, and the detector signals are gated on or measured after the sources are extinguished and just prior to the expected time for the test light stimulus to make the round trip through the optical conduit from the LFU to the LID and back. In this manner, any stray light coupled into the detector(s) and light scattered back on the outbound leg, as in the cavity of the optical couplers, will dissipate prior to the detectors being gated on and hence will not contribute to the continuity test measurement. Since the sources and detectors are operated with relatively fast rise times, the pulse repetition rate can be quite high if desired.

Light reflected from the active source via the LID is detected by the LBIT detector 48. Assuming continuity exists, a greater photocurrent will be produced by the photodetector(s) 48 during the phase in which the 810 nm source is activated, since more of the light from that source is reflected by the dichroic filter. The output of the LBIT detector 48 is amplified by an amplifier 57 to produce a signal at node 58 as shown in FIG. 7. The signal in FIG. 7 contains segments corresponding to no test illumination of the fiber optic conduit, and to illumination of the conduit by LBIT sources 36 and 38 separately. A synchronous detector 61, in synchronism with the source chopper 33, separates this stream of segments into two signals A' and B', each with a parameter such as level or amplitude corresponding to the short-term averaged dark-current-corrected photocurrents produced respectively by source 36 alone and source 38 alone.

Signals A' and B' are processed by signal logic block 63 to produce a pass/fail output signal indicating the integrity of the fiber optic conduit/LID relative to pre-established criteria. One approach to the signal logic function is to provide the signal logic block of each laser firing channel with pass/fail thresholds corresponding to the number of connectors known to be in that channel. Referring to FIG. 3, the minimum and maximum expected values of A' and B' are determined for the number of connectors involved. The signal logic block compares the actual values of A' and B' against these limits. In addition, it can be seen that the expected difference between A' and B' bears some relation to the magnitude of A in that the lower the insertion loss in the optical conduit, the greater the difference between A' and B' relative to the magnitude of A. Therefore, the "ratiometric" pass/fail criterion for the channel can be stated as $A' - B' > g(A')A'$, when coefficient g is a function A'. The detector block outputs a "pass" signal only if these magnitude and ratiometric tests are satisfied. Otherwise, the block outputs a "fail" signal. Depending upon the degree of built-in fault diagnosis desired, the signal logic block can be designed to provide other outputs indicative of fault conditions, such as the total absence of A', indicative of source A failure. Another possible signal logic pass/fail criterion is that measured continuity exceed that required for all fire initiation, regardless of the number of connectors in the channel.

The foregoing discussion has assumed that the initiation mixture exhibits a low reflectance. If on the contrary the initiation mixture exhibits a high reflectance, then much of the light injected via the optical conduit into the LID from both sources A and B will be reflected, making ratiometric continuity testing difficult or impossible. By using, instead of a single dichroic filter, a combination of a dichroic filter and an absorption filter, ratiometric detection may be used successfully regardless of the reflectance of the initiation mixture. Moreover, the safety of the built-in-test procedure may be enhanced because much less of the test energy will impinge the pyrotechnic material.

Various combinations of longpass, shortpass, bandpass and bandstop dichroic and absorption filters may be used in the LID to implement the LBIT method and enhance safety. An absorption filter typically consists of a plate of colored glass. The dichroic element, on the other hand, may be a discrete dichroic filter element, a dichroic filter deposited on either the front or back side of the absorption filter, or a dichroic filter deposited on some other optical surface of the LID, such as a focusing lens or an explosive pressure containment window.

FIG. 8a illustrates the case in which the dichroic and absorption filters are both longpass filters with the cutoff wavelength of the dichroic filter being longer than the cutoff wavelength of the absorption filter. In each of FIGS. 8a–8f, the transmittance characteristic of the dichroic filter is indicated by a dashed line and the transmittance characteristic of the absorption filter is indicated by a solid heavy line. In addition, the power spectrum of the A and B sources is indicated, as is the narrow spike-like power spectrum of the firing laser. Permissible and impermissible orderings of the respective filter elements are indicated in the bottom portion of each figure.

In FIG. 8a, a permissible ordering of the filter elements is shown to be the dichroic filter (dashed line) followed by the absorption filter (heavy solid line). Light from source A, since it is within the stopband of the dichroic filter, is largely reflected and does not reach either the absorption filter or the pyrotechnic material. Light from source B, since it is within the passband of the dichroic filter but within the stopband of the absorption filter, passes through the dichroic filter but is absorbed by the absorption filter and prevented from reaching the pyrotechnic material. The possibility of light from the test sources igniting the pyrotechnic material is therefore minimized. The opposite ordering of the filter elements is impermissible. If the absorption filter came before the dichroic filter, since both test sources A and B are within the stopband of the absorption filter, virtually no light from either of the test sources would be reflected, making continuity testing impossible.

As shown in FIG. 8b, if the cutoff wavelengths of the dichroic and absorption filters are reversed such that the cutoff wavelength of the absorption filter is lower, then the permissible and impermissible orderings are also reversed such that the absorption filter must precede the dichroic filter. Light from source A passes through the absorption filter and is reflected by the dichroic filter, whereas light from source B is absorbed by the absorption filter.

FIGS. 8c and 8d illustrate corresponding cases using shortpass dichroic and absorption filters. In FIG. 8c, as in FIG. 8a, light from source A is reflected by the dichroic filter and light from source B passes through the dichroic filter and is absorbed by the absorption filter. In FIG. 8d, as in FIG. 8b, light from source A passes through the absorption filter and is reflected by the dichroic filter and light from source B is absorbed by the absorption filter.

FIG. 8e and 8f illustrate cases in which the dichroic and absorption filters are of opposite types, either shortpass or longpass. Both possible orderings of the filters are permissible. In FIG. 8e, if the dichroic filter precedes the absorption filter, light from source A is reflected by the dichroic filter and light from source B passes through the dichroic filter and is absorbed by the absorption filter. If the absorption filter precedes the dichroic filter, light from source A passes through the absorption filter and is reflected by the dichroic filter and light from source B is absorbed by the absorption filter. FIG. 8f illustrates the case in which the characteristics of the two filters are reversed.

The selection of a particular filter arrangement for a given application depends upon various factors including the wavelength of the initiating laser, the availability of LBIT sources A and B of various wavelength bands separate from the initiating laser wavelength, the efficiency, durability, laser damage threshold, and cost of various filters, and the significance and spectral distribution of hazardous stimuli (flux from sources other than the test sources or the initiating laser, which has the potential to initiate the LID). If broadband optical hazards are deemed significant, then the arrangements shown in FIG. 8e and 8f would be preferable since they constitute a bandpass filter system centered at the laser wavelength, which attenuates light of wavelength significantly different than that of the laser.

The dual-source system using one or more photodetectors having identical characteristics may be schematically represented as shown in FIG. 9a. Sources are represented by darkened block letters and include test sources A and B and the initiating laser source L. Other elements in the system are represented by outlined block letters and include an LBIT source power reference sensor R and an LBIT sensor S. The optical conduit includes a fiber face F, in-line fiber-optic connectors I and the initiator target T. Light from the test sources A and B is alternately coupled into the fiber at intensities determined using the LBIT reference sensor R, and reflections back through the fiber are sensed by the LBIT sensor S.

The embodiments thus far described accomplish spectrographic operation through the use of two spectrally distinct sources and a broadband detector spanning both source wavelength bands. However, it is also feasible to use a single source combined with two spectrally-distinct detectors to accomplish the same objective. These detectors have a narrowband or possibly longpass or shortpass spectral sensitivities, where one detector has high sensitivity to one test wavelength and low sensitivity to the other test wavelength. The other detector has the opposite sensitivities to the first detector. These detectors may be implemented by placing optical filters in front of the photosensitive areas of ordinary photodetectors. FIG. 9b illustrates the spectral allocations required for the single source approach. The method requires a source whose power spectrum is sufficiently broad to span the separate response wavelength bands of the two detectors. An incandescent source would be ideal because of its broad optical power spectrum but would be precluded from consideration in many applications due to the unreliability and fragility of such a source. Other white light sources would be feasible. The power spectrum of a laser diode is too narrow for this application. However, the power spectrum of a typical infrared LED is about 150 nm wide at its 20% power points. This span is significantly broader than the cutoff slope of a dichroic filter, which, for a 900 nm cutoff filter, is in the range of 30 to 45 nm (5% to 80% points on the filter transmission curve). Therefore, if the LED is selected to have its spectral peak centered on the filter cutoff region, the LED generates useful amounts of power in both the passband and stopband of the filter.

The LBIT detectors are fitted with dichroic filters having the same cutoff point, one detector filter having a shortwave pass filter spectral characteristic to detect the power reflected by the conduit in the stopband of the LID dichroic, the other detector filter having a longwave pass spectral characteristic to detect the power reflected by the conduit in the passband of the LID dichroic. Short and longwave pass absorption type filters can be used to separate the detector response bands if these filters provide sufficiently sharp cutoffs. One advantage of the single source approach is that the source power reference detector may be deleted from the system, because the spectral shape of the LED source power is likely to remain substantially constant during aging and may be used without a power level reference so long as the spectral peak does not shift excessively. Likewise, the relative sensitivities of the two detectors can be expected to remain substantially constant with temperature and aging.

As mentioned previously, either LEDs or laser diodes may be used as test sources in the laser ordnance test system. LEDs have the appropriate low power levels required for safe continuity testing. However, because an LED has a large emitting surface which radiates nondirectionally, it is not possible to obtain a highly collminated beam of LED light, and hence it is not possible to focus the LED beam at the optical conduit fiber face to a focal spot as small as the fiber face. Some flooding of the coupler cavity in the vicinity of the fiber face by light from the LED is acceptable, provided that the spectral balance of the scattered light is unchanged. However, to reduce detector shot noise due to high levels of background light, it is possible to obtain a smaller LED focal spot by first focusing the LED onto a small pinhole, the output of which is collimated and focused onto the fiber face. Laser diodes have smaller emitting areas and produce elliptical beams which are reasonably well collimated in one axis (the "slow" axis) but widely divergent in the other axis (the "fast" axis). Since the power level of typical laser diodes exceeds the source power requirements for continuity testing, it is possible to adequately collimate the diode with an inexpensive lens and form a small focal spot at the coupler fiber face with the coupler lens. It may also be desirable to place an optical attenuator over the laser diode to restrict is optical power output to safe levels for continuity testing.

When the initiating laser of the LFU is a laser diode rather than a solid state laser such as a rod laser, it is not practical to couple sufficient laser diode power to the fiber optic conduit with the free space coupling lens described in relation to the embodiments of FIGS. 1 and 5. The use of such a coupling lens, and the resulting ability to use other portions of the fiber optic conduit cone of acceptance for continuity test purposes, depends upon the highly collimated beam of a solid state laser, which can be projected over considerable distances of free space without significant growth of laser beam diameter. On the other hand, the highly elliptical and divergent beam of a laser diode is difficult to fully collimate so as to preserve substantial portions of beam energy as the beam travels through a train of optical elements.

For this reason, laser diodes used for ordnance initiation purposes, where efficient power coupling is paramount, are generally supplied as fiber-terminated assemblies. In these assemblies, a fiber pigtail is butt coupled to the emitting facet surface of the laser diode to gather light directly from the emitting facet or facets. In simple ordnance systems, this fiber pigtail is then connected to the fiber optic conduit leading to the LID, providing no ready access for continuity test illumination and detection. It is possible to detect light from the conduit which passes through the laser diode by means of a photodetector positioned to view the back facet of the laser diode. However, the transmittance of the laser diode is quite spectrally dependent, since the laser diode material is highly absorptive in at least the lasing band of the device, and any photodetector placed behind the diode is likely to be employed to regulate the power output of the diode. Therefore it is desirable, when using a laser diode for initiation, to obtain continuity test coupling in another manner, in particular, through the use of fiber optic couplers.

Fiber optic couplers are passive fiber optic networks having a number of input and output fiber terminations called ports. The optical flux entering a given port is forced to refract into fibers within the coupler that are brought out to other ports. The relative power levels produced at the output ports due to power injected at a given input port can be adjusted by design of the coupler to be equal or unequal. Most couplers are bidirectional, that is optical power injected into a port designated as an output port couples to the ports designated as input ports with equal facility. Depending on the numbers of input and output ports, fiber optic couplers are designated as stars (multiple inputs and multiple outputs), trees (single input, multiple outputs), or taps (trees with unequal power division among outputs).

Using both a tree-type and a star-type coupler, a dual-source single-detector system of the type described in relation to FIGS. 1 and 5 may be realized in conjunction with an initiating, fiber-terminated laser diode. Referring to FIG. 11a, light from the test sources A and B is input to a 2×2 star coupler and is divided between a reference port connected to an LBIT source power reference detector R and a stimulus port connected to one input of 3:1 tree-type coupler. This stimulus, attenuated by the insertion loss of the tree, is injected into the fiber optic energy transfer conduit leading to the LID.

As illustrated in FIG. 11b, in a dual-source, single-detector system, the laser initiation source L and the single LBIT source H are coupled through a 3:1 tree-type coupler onto the fiber face F. Light reflected back through the optical conduit is coupled through the 3:1 tree-type coupler to a 2:1 tree-type coupler in which the reflected light is split equally between first and second detectors J and K.

Alternatively, as illustrated in FIG. 11c, a single 4:1 tree-type coupler may be used. Light from the sources L and H is coupled onto the fiber face F. Optical power reflected back through the optical conduit is divided equally between the two detectors J and K.

An additional means of coupling the LBIT illuminating and detecting means to the fiber optic conduit is the use of integrated waveguides, or planar couplers. These devices are functionally similar to fiber optic couplers except that the elements which guide, split, or combine the various light paths are integrated on a solid substrate, such as through the creation of branching waveguides on a glass substrate through the deposition or diffusion of materials. These planar couplers can be interfaced to the various electro-optic devices used in the laser initiation and continuity test system via fiber optic segments, or one or more of the electro-optic devices can be physically integrated with the coupler.

In all of the embodiments thus far described, the LBIT source(s) and detector(s) are optically coupled to the fiber optic conduit without interrupting the coupling of the initiating laser to the fiber optic conduit. These arrangements, both of the free-space and fiber coupler configurations, are preferable in those applications that cannot tolerate the potential unreliability or optical alignment inaccuracy of moving parts, or in which the exercise of continuity testing must not interfere with operation of the system to initiate the LID. However, where these restrictions do not apply, it is possible to couple the continuity test elements to the fiber optic conduit with a wide variety of arrangements that use moving parts. For example, it is often desirable for safety reasons to provide one or more mechanical shutters or beam diverters in the initiating laser beam path to prevent the initiating laser from being coupled to the fiber optic conduit except when these shutters or diverters are removed from the path. These blocking or diverting mechanisms can be designed to couple the continuity test elements to the fiber optic conduit when one or more of them is positioned to interrupt the initiating laser beam. For example, a shutter adjacent to the optical coupler lens can carry an LBIT detector or detectors that view the coupler lens when the shutter is placed in the initiating laser beam path. Likewise, the LBIT injection prism of FIG. 1 could be incorporated as a movable element which is inserted into the laser beam path during continuity testing. In all cases, the shutter arrangement should be designed to protect the continuity test elements, from optical or thermal damage during laser firings.

For systems in which the initiating laser is a laser diode, it is feasible to use fiber optic switches in lieu of, or in conjunction with, fiber optic couplers to provide continuity test access to the fiber optic conduit. For example, a single-pole double-throw fiber optic switch can be used, which switches the fiber optic conduit between the initiating laser in one position and a fiber optic tree coupler in the other position. The coupler in turn ports LBIT sources and detectors into the switch for coupling to the fiber optic conduit.

The use of moving elements to effect LBIT coupling further facilitates the use of the high power ordnance-initiating laser as a continuity test source by providing the ability to insert an optical attenuator in the beam path of the initiating laser for the purpose of attenuating the laser beam to a level safe for continuity testing. For example, when the initiating laser is a solid state laser such as a rod laser, the movable attenuator can consist of an absorption filter, a beamsplitting filter, or other means. When the initiating laser is a laser diode, the attenuation can be accomplished by means of a fiber optic switch pole that is deliberately misaligned or separated to provide the desired level of attenuation, or which switches the laser diode beam through an attenuating element enroute to the fiber optic conduit. Such optical attenuation of the laser diode beam for continuity test purposes can be used in conjunction with or in lieu of electrical means provided to reduce the laser diode optical power output by limiting the laser diode input current to a low level.

All of the laser ordnance systems so far described utilize lasers operating in a continuous wave (CW) mode to operate LIDs by the action of heating a pyrotechnic material to its autoignition point. In these systems, the generation of deflagration (burning) output is provided by LID squibs, while the generation of detonation (shock) output is provided by deflagration-detonation transfer (DDT) LID detonators. However, it is also possible, by using a Q-switched solid state initiating laser, to operate a so-called "direct detonation" LID via a fiber optic conduit. In some such LIDs, an insensitive explosive material is detonated by the shock of a "flyer" element set in motion by plasma generated by the intense optical pulse interacting with the flyer or surrounding material. In these Q-switched, fiber-coupled systems, it is essential to ensure that the various interfaces in the optical conduit are free from significant contamination, since such contamination can absorb a large fraction of the initiation pulse, generating a plasma at the contaminated interface, which absorbs further laser energy, resulting in insufficient energy delivered to the LID and/or the prompt or subsequent stress failure of the contaminated interface. For this reason, it is essential to provide a continuity test method which is capable of detecting transmission losses in the conduit beyond those attributable to clean fiber optic connectors. Those skilled in the art will recognize that the method of the present invention is applicable to these Q-switched, direct detonation laser ordnance systems.

It is possible to generate the intense, highly focussed light beams required to initiate ordnance via a fiber optic conduit using initiating sources other than lasers. For example, an arc lamp, or similar high-intensity, non-coherent source, can be focussed into a fiber optic conduit to operate a LID. Those skilled in the art will recognize that the continuity test method heretofore described in conjunction with laser initiating sources can be applied to fiber coupled ordnance systems which use any form of initiating optical energy source.

Many types of systems other than ordnance systems have their various modules optically coupled to each other over short or large distances by fiber optic conduit. For example, the telecommunications industry uses extensive fiber optic communications networks and has been largely responsible for the refinement of many reflectrometry methods for the diagnosis of fiber optic continuity. The principle of OTDR and the expense of the OTDR equipment has been previously noted. Of this equipment, some types are equipped to operated selectively in several different wavelength bands for the purpose of achieving the greatest propagation distance with a given type of optical fiber. However, there is no instance known in which the OTDR method, or any other reflectrometry method, is concurrently used in several wavelength bands to access continuity of fiber optic communications channels differentially or ratiometrically. Likewise, the use of fiber coupled sensors is becoming commonplace, in which a sensor is coupled to a remotely located instrumentation module via a fiber optic conduit.

Those skilled in the art will recognize that the method of the present invention can be applied to these other fields of fiber optic application, be it communication or remote sensing. For example, many fiber optic communications links operate with so-called single-mode optic fiber to minimize the effects of frequency dispersion over distance. By placing a dichroic reflector at the far terminus of such a system, and having the existing communications wavelength band in the passband of the filter, the communication channel operates without adverse effect, other than the small attenuation presented by the filter. However, continuity test stimulus of a (second) wavelength band in the stopband of the filter, can be transmitted in the channel concurrently with or interspersed with traffic in the communications wavelength band so long as the attenuation provided by the filter is sufficient to suppress the continuity test energy at the receiver of the far terminus. The power reflected in the communications wavelength band can be ratiometrically or differentially compared to the power reflected in the continuity test wavelength band to assess conduit continuity. This on-line continuity verification method requires no modification of the equipment at the far terminus other than the installation of an in-line dichroic filter before the equipment optical port, and requires no modification of the communications protocol used on the channel.

In the case of remote sensing systems, continuity testing of the fiber optic link to a sensor can be likewise effected by installing an in-line dichroic filter at the sensor terminus such that the wavelength bands used to interrogate and monitor the sensor lie in the passband of the filter. This method facilitates the diagnosis of an unresponsive sensor channel as a failed sensor (good continuity to the dichroic filter but no sensor activity) or as a failed optical conduit (insufficient continuity to the dichroic filter). Again, the continuity test method of the present invention can be applied with no modification to the sensor or to its operating protocol. These various applications of the present method are illustrated in FIG. 12.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims:

What is claimed is:

1. In a laser ordnance initiation system having a laser firing channel, including a fiber optic conduit coupling a laser firing unit to a laser initiated device for firing the laser initiated device using an initiating laser, apparatus for testing optical integrity of the laser ordnance initiation system, comprising:

means associated with the laser initiated device for providing optical spectrally-dependent reflection of light back into the fiber optic conduit;

means associated with the laser firing unit for illuminating the fiber optic conduit and for detecting the intensity of light reflected through the fiber optic conduit within a plurality of wavelength bands in which said means associated with the laser initiated device presents different degrees of reflectance; and means for processing detected intensities of reflected light within said plurality of wavelength bands for verifying the optical continuity of the laser firing channel and presence of the laser initiated device at a far terminus of the laser firing channel.

2. The apparatus of claim 1 wherein said means for providing spectrally-dependent reflection of light comprises an initiating mixture illuminated by the fiber optic conduit and having substantially different reflectance in different ones of said plurality of wavelength bands.

3. The apparatus of claim 1 wherein said means for providing spectrally-dependent reflection of light comprises a dielectric optical filter having a passband including a wavelength band of said laser and one of said plurality of wavelength bands, and having a stopband including another of said plurality of wavelength bands.

4. The apparatus of claim 1 wherein said means for providing spectrally-dependent reflection of light comprises in combination a dielectric optical filter and an absorption-type optical filter, the combination of filters transmitting light in the wavelength band of said laser, reflecting a substantial portion of light in one of said plurality of wavelength bands, and absorbing a substantial portion of light in another of said plurality of wavelength bands.

5. The apparatus of claim 2 or 3 or 4 wherein said means for illuminating and detecting comprises a plurality of photodetectors having different spectral responses and continuity test illumination means having an optical power spectrum a portion of which overlaps spectral responses of each of said plurality of photodetectors.

6. The apparatus of claim 5 wherein said means for providing spectrally-dependent reflection of light comprises a dichroic filter having a cutoff wavelength, and wherein said continuity test illumination means comprises a single LED whose optical power spectrum straddles said cutoff wavelength.

7. The apparatus of claim 5 wherein said continuity test illumination means comprises a plurality of spectrally distinct sources, the optical power spectrum of each source overlapping the response spectrum of only one of said plurality of photodetectors.

8. The apparatus of claim 2 or 3 or 4 wherein said means for illuminating and detecting comprises a plurality of spectrally distinct light sources that are activated sequentially and a photodetector whose optical response spectrum overlaps the power spectrum of each of said plurality of light sources.

9. The apparatus of claim 8 wherein said plurality of light sources are LEDs.

10. The apparatus of claim 8 wherein said plurality of light sources are laser diodes.

11. The apparatus of claim 10 wherein said laser is a laser diode which when operated in a low-power mode or when optically attenuated serves as one of said light sources.

12. The apparatus of claim 8 wherein one of said light sources is an LED and another of said light sources is a laser diode.

13. The apparatus of claim 12 wherein said laser is a laser diode, which when operated in a low-power mode, serves as one of said light sources.

14. The apparatus of claim 2 or 3 or 4 wherein said means for illuminating and detecting comprises a plurality of test sources, said apparatus further comprising a source power reference photodetector illuminated by said test sources, and means responsive to said source power reference photodetector for controlling said test sources to determine power levels within said plurality of wavelength bands in which the fiber optic conduit is illuminated.

15. The apparatus of claim 14 wherein said means responsive to the source power reference photodetector adjusts said power levels to desired relative values.

16. The apparatus of claim 14 wherein said means responsive to the source power reference photodetector normalizes detected reflected light signals to compensate for possible differences in said power levels.

17. The apparatus of claim 2 or 3 or 4 wherein said means for illuminating and detecting is coupled to the fiber optic conduit such that illumination and detection, respectively, occur through respective spatially-allocated portions of a cone of acceptance of a laser firing unit terminus of the fiber optic conduit.

18. The apparatus of claim 17 wherein said means for illuminating and detecting comprises lens means for focusing continuity test light onto a fiber face of the laser firing unit terminus of the fiber optic conduit and for focusing an initiating laser energy beam from said laser onto the fiber face.

19. The apparatus of claim 18 wherein said means for illuminating and detecting comprises a photodetector situated intermediate said fiber face and said lens means for detecting reflected light from an allocated portion of said cone of acceptance of said conduit without the light having passed through said lens means.

20. The apparatus of claim 18 wherein said means for illuminating and detecting comprises a photodetector situated such that said lens means is intermediate the photodetector and said fiber face, for detecting reflected light from an allocated portion of said cone of acceptance of said conduit after said light has passed through said lens means.

21. The apparatus of claim 2 or 3 or 4 further comprising integrated optical coupler means having a plurality of ports, one port being coupled to a laser firing unit terminus of the fiber optic conduit, another port being coupled to said laser, and a plurality of other ports being connected to said means for illuminating and detecting.

22. The apparatus of claim 2 or 3 or 4 wherein said processing means comprises means for calculating the difference between reflected light detected in one of said plurality of wavelength bands and reflected light detected in another of said plurality of wavelength bands.

23. The apparatus of claim 22 wherein said processing means further comprises means for comparing the magnitude of light reflected in one of said plurality of wavelength bands to an established limit.

24. The apparatus of claim 2 or 3 or 4 wherein said processing means further comprises means for calculating the ratio of reflected light detected in one of said plurality of wavelength bands and reflected light detected in another of said plurality of wavelength bands.

25. The apparatus of claim 24 wherein said processing means further comprises means for comparing the magnitude of light reflected in one of said plurality of wavelength bands to an established limit.

26. The apparatus of claim 2 or 3 or 4 wherein said means for illuminating and detecting comprises means for producing a light pulse, a photodetector, and means for gating a signal from said photodetector at a time delayed from an end of said light pulse by a time slightly less than an expected round trip transit time of light through an entire length of said fiber optic conduit.

27. The apparatus of claim 1 further comprising means for mechanically interrupting a beam path from said initiation laser to said fiber optic conduit.

28. The apparatus of claim 27 wherein at least a part of said means for illuminating and detecting is physically mounted on said means for mechanically interrupting such that a beam path between said part of said means for illuminating and detecting and said fiber optic conduit is formed when said beam path from said laser to said fiber optic conduit is interrupted.

29. The apparatus of claim 27 wherein said means for mechanically interrupting comprises means for completing a beam path from a part of said means for illuminating or detecting to said fiber optic conduit at substantially the same time as said beam path from said initiation laser to said fiber optic conduit is interrupted.

* * * * *